United States Patent
Kruglick (10) Patent No.: US 9,268,587 B2
(45) Date of Patent: Feb. 23, 2016

(54) DETERMINING DESTINATION CLOUD SYSTEM REQUIREMENTS

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 296 days.

(21) Appl. No.: 13/579,018

(22) PCT Filed: Apr. 13, 2012

(86) PCT No.: PCT/US2012/033517
§ 371 (c)(1),
(2), (4) Date: Aug. 14, 2012

(87) PCT Pub. No.: WO2013/154578
PCT Pub. Date: Oct. 17, 2013

(65) Prior Publication Data
US 2013/0275971 A1    Oct. 17, 2013

(51) Int. Cl.
*G06F 9/46* (2006.01)
*G06F 9/455* (2006.01)
*G06F 11/36* (2006.01)
*G06F 9/50* (2006.01)
*G06F 11/34* (2006.01)

(52) U.S. Cl.
CPC .......... *G06F 9/45533* (2013.01); *G06F 9/5077* (2013.01); *G06F 11/3442* (2013.01); *G06F 11/3692* (2013.01); *G06F 2201/815* (2013.01); *G06F 2209/501* (2013.01)

(58) Field of Classification Search
CPC .......... G06F 11/1484; G06F 11/36–11/3696; G06F 9/45533–9/45558; G06F 9/4856; G06F 9/5088
USPC .......................... 717/101–178; 718/100–108
See application file for complete search history.

(56) References Cited

U.S. PATENT DOCUMENTS

| | | | | |
|---|---|---|---|---|
| 7,779,389 B2* | 8/2010 | Markov | .............. | G06F 9/44505 717/120 |
| 7,802,000 B1* | 9/2010 | Huang | .................. | G06F 9/5077 455/404.2 |
| 8,381,211 B2* | 2/2013 | Ashok | ....................... | G06F 8/63 718/1 |
| 8,495,512 B1* | 7/2013 | Lappas | ................. | G06F 9/5077 715/764 |
| 8,732,291 B2* | 5/2014 | Zhu | ........................ | H04L 67/303 709/217 |
| 8,739,157 B2* | 5/2014 | Ho | ........................ | G06F 9/5077 714/3 |
| 8,782,640 B2* | 7/2014 | Ashok | ....................... | G06F 8/63 718/1 |
| 8,843,918 B2* | 9/2014 | Semerdzhiev | .......... | G06F 9/455 717/174 |
| 2008/0005782 A1 | 1/2008 | Aziz | | |
| 2010/0332818 A1 | 12/2010 | Prahlad et al. | | |
| 2011/0022658 A1 | 1/2011 | Pace et al. | | |
| 2011/0214124 A1* | 9/2011 | Ferris et al. | ....................... | 718/1 |
| 2011/0225467 A1* | 9/2011 | Betzler et al. | ................... | 714/55 |
| 2011/0239214 A1* | 9/2011 | Frields et al. | ..................... | 718/1 |
| 2011/0258481 A1* | 10/2011 | Kern | .............................. | 714/4.1 |

(Continued)

OTHER PUBLICATIONS

Remus: High Availability via Asynchronous Virtual Machine Replication—Brendan Cully, Geoffrey Lefebvre, Dutch Meyer, Mike Feeley, Norm Hutchinson, and Andrew Warfield—Department of Computer Science the University of British Columbia and Citrix Systems, Inc—2008.*

(Continued)

*Primary Examiner* — Jason Mitchell
*Assistant Examiner* — Francisco Aponte (57) ABSTRACT

Technologies and implementations for testing cloud systems to determine destination cloud system requirements are generally disclosed.

16 Claims, 4 Drawing Sheets

(56) References Cited

U.S. PATENT DOCUMENTS

| | | | |
|---|---|---|---|
| 2011/0265082 A1* | 10/2011 | Ashok et al. | 718/1 |
| 2012/0017210 A1* | 1/2012 | Huggins et al. | 718/1 |
| 2012/0030672 A1* | 2/2012 | Zygmuntowicz et al. | 718/1 |
| 2012/0042061 A1* | 2/2012 | Ayala et al. | 709/224 |
| 2012/0060167 A1* | 3/2012 | Salsburg et al. | 718/104 |
| 2012/0102487 A1* | 4/2012 | Cahill et al. | 718/1 |
| 2013/0132774 A1* | 5/2013 | Somendra | 714/32 |
| 2013/0174117 A1* | 7/2013 | Watters et al. | 717/106 |
| 2013/0232463 A1* | 9/2013 | Nagaraja | G06F 8/61 717/101 |

OTHER PUBLICATIONS

De Gelas, Johan, Infrastructure as a Service: Benchmarking Cloud Computing, AnandTech, Jun. 2, 2011, accessed online on Aug. 10, 2012 via http://www.anandtech.com/show/4349/infrastructure-as-a-service-benchmarking-cloud-computing/6.

cloudharmony.com, Benchmarks | CloudHarmony, 2011, accessed online on Aug. 10, 2012 via http://cloudharmony.com/benchmarks.

Amazon Web Services, Amazon EC2 Service Level Agreement, Oct. 23, 2008, accessed online on Aug. 10, 2012 via http://aws.amazon.com/ec2-sla/.

Rackspace Cloud Legal, Service Level Agreement, 2012, accessed online on Aug. 10, 2012 via http://www.rackspace.com/cloud/legal/.

Barmijo, 3tera's Cloud Computing SLA goes live, Mar. 31, 2009, accessed online on Aug. 10, 2012 via http://blog.3tera.com/computing/175/.

Wikipedia, Paxos (Computer science), Jul. 23, 2012, accessed online on Aug. 10, 2012 via http://en.wikipedia.org/wiki/Paxos_(computer_science).

Open Data Center Alliance, Open Data Center Usage Models, 2012, accessed online on Aug. 10, 2012 via http://www.opendatacenteralliance.org/ourwork/usagemodels.

Unified EFI Forum homepage, 2005-2012, accessed online on Aug. 10, 2012 via http://www.uefi.org/home/.

Miller, Rich, CoreSite, Interxion Partner on Cloud Customers, Jun. 7, 2011, accessed online on Aug. 10,2012 via http://tinyurl.com/3wzhcwc.

Li, Ang, et al, Comparing Public-Cloud Providers, IEEE Internet Computing, Mar./Apr. 2011, pp. 50-53, vol. 15, issue 2, IEEE Computer Society, USA.

Li, Ang, et al, CloudCmp: Shopping for a Cloud Made Easy, HotCloud'10 Proceedings of the 2nd USENIX conference on Hot topics in cloud computing, 2010, pp. 1-7, USENIX Association, Berkeley, CA, USA.

United States Patent and Trademark Office, International search report and written opinion of the International searching authority for PCT/US2012/033517, mailed on Jul. 17, 2012, USA.

Berg, D., "Development & Training using Cloud (Promotion)," IBM, pp. 4 (Jun. 16, 2011).

* cited by examiner

300 A computer program product

302 A signal bearing medium

304 Machine-readable instructions that, when executed, cause a computer to replicate computing environments in cloud computing services by:

transferring, via a destination cloud system, one or more system test tasks to an origin cloud system, wherein the system test tasks are configured to test a service deployment on an origin virtual machine to generate one or more tested performance metrics;

receiving, via the destination cloud system, the one or more tested performance metrics;

configuring, via the destination cloud system, a destination virtual machine to run the service deployment based at least on the one or more tested performance metrics; or     determining, via the destination cloud system, a file system architecture-type associated with the origin virtual machine based at least in part on the one or more tested performance metrics, wherein the file system architecture includes one or more of the following architecture types: a backup-type architecture, a master/slave-type architecture, a multiple master-type architecture, a two-phase commit-type architecture, and/or a Paxos-type architecture.

| 306 a computer-readable medium | 308 a recordable medium | 310 a communications medium |
|---|---|---|

DETERMINING DESTINATION CLOUD SYSTEM REQUIREMENTS

CROSS-REFERENCE TO RELATED APPLICATION

The present application is a U.S. national stage filing under 35 U.S.C. §371 of International Application No. PCT/US2012/033517, filed on Apr. 13, 2012.

BACKGROUND

Unless otherwise indicated herein, the approaches described in this section are not prior art to the claims in this application and are not admitted to be prior art by inclusion in this section.

Generally, cloud computing services may be becoming more prevalent. In some instances, a customer planning to switch from one cloud service provider to another may be concerned about the performance of the new cloud service provider with respect to the previous cloud computing service provider.

SUMMARY

The present disclosure describes examples methods for testing cloud systems to determine destination cloud system requirements. Example methods may include transferring system test tasks to an origin cloud system, such that the system test tasks may be configured to test a service deployment on an origin virtual machine to generate tested performance metrics, receiving the tested performance metrics, and configuring a destination virtual machine to run the service deployment based on the tested performance metrics.

The present disclosure also describes example apparatuses for testing cloud systems to determine destination cloud system requirements. Example apparatuses may include a module configured to transfer test tasks configured to test a service deployment on an origin virtual machine to generate tested performance metrics, a module configured to receive the tested performance metrics, and a module configured to configure a destination virtual machine to run the service deployment based on the tested performance metrics.

The present disclosure also describes example articles for testing cloud systems to determine destination cloud system requirements. Example articles may include a signal bearing medium having machine-readable instructions stored thereon, which, if executed by one or more processors, operatively enable a computing device to transfer system test tasks configured to test a service deployment on an origin virtual machine to generate tested performance metrics, receive the tested performance metrics, and configure a destination virtual machine to run the service deployment based on the tested performance metrics.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings

DETAILED DESCRIPTION

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to testing cloud systems to determine destination cloud system requirements.

As will be appreciated, in some instances, a customer of a cloud computing service (e.g., a customer having a service deployment at an origin cloud system) may plan to move or may consider moving to a different cloud computing service (e.g., the customer may move to a service deployment at a destination cloud system). Moving between cloud computing services may require more than matching publically revealed specifications across the cloud system transfer. For example, a service deployment at a cloud system may include specific file system architectures, network traffic characteristics, time to launch virtual machines, file system performance, variability in system time references, or the like, that may provide unpredictable and important impacts to the operation of the cloud system. It may be desirable for a destination cloud system to obtain substantially detailed and wide ranging measurements from the origin cloud system to allow preparation and/or configuration for the destination cloud system to substantially match or improve upon the origin cloud system.

As discussed further herein, in some examples, one or more system tasks may be transferred to an origin cloud system. In some examples, the system tasks may be configured to test one or more service deployments on a virtual machine of the origin cloud system and to generate one or more tested performance metrics. In some examples, the one or more tested performance metrics may be received. In some examples, a destination virtual machine may be configured to run based at least in part on the received one or more tested performance metrics. Such techniques may provide a destination cloud system with one or more virtual machines configured to run the service deployment or deployments currently being run at the origin cloud system. In some examples, a virtual machine at the destination center may be configured to match one or more properties of a virtual machine at the origin center. In some examples, a virtual machine at the destination center may be configured to operate with deliberate differences from a virtual machine at the origin center. In some examples, the described techniques may be performed by the destination cloud system itself. In other examples, the techniques may be provided as a service by a third party.

Figure 1:
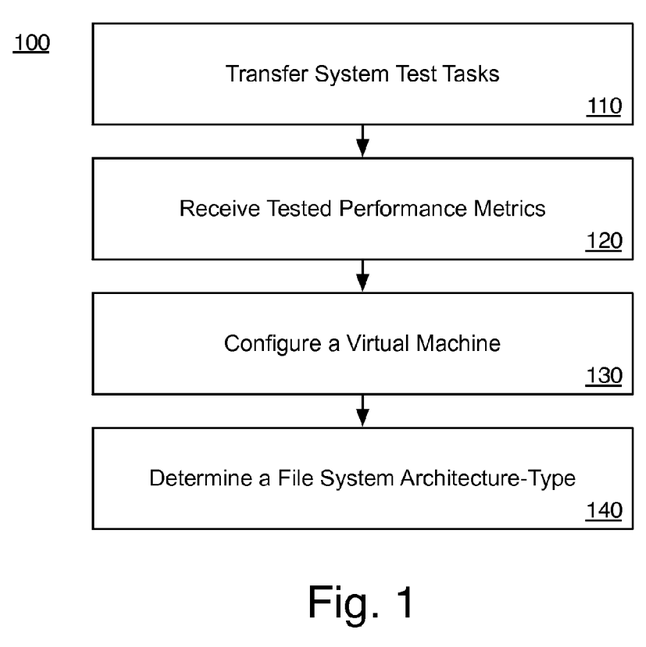
FIG. 1 is an illustration of a flow chart of an example method for testing a cloud system to determine destination cloud system requirements.

FIG. 1 is an illustration of a flow chart of an example method 100 for testing a cloud system to determine destination cloud system requirements, arranged in accordance with at least some embodiments of the present disclosure. In general, method 100 may be performed by any suitable device, devices, or system such as those discussed herein. In some examples, method 100 may be performed by a destination cloud system. In some examples, method 100 may be performed by a third party cloud services provider. In some examples, method 100 may be performed by a datacenter or datacenter cluster, or the like. In some examples, method 100 may be performed by a cloud computing service. In some examples, method 100 may be performed by an Infrastructure as a Service (IaaS) provider or a Platform as a Service (PaaS) provider, or the like. In some examples, method 100 may be performed by system as discussed herein with respect to FIG. 4.

Method 100 sets forth various functional blocks or actions that may be described as processing steps, functional operations, events and/or acts, etc., and that may be performed by hardware, software, and/or firmware. Those skilled in the art in light of the present disclosure will recognize that numerous alternatives to the functional blocks shown in FIG. 1 may be practiced in various implementations. For example, although method 100, as shown in FIG. 1, includes one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Method 100 may include one or more of functional operations as indicated by one or more of blocks 110, 120, 130 and/or 140. The process of method 100 may begin at block 110.

At block 110, "Transfer System Test Tasks", one or more system test tasks may be transferred to an origin cloud system. In general, the one or more system test tasks may be configured to test a service deployment on an origin virtual machine of an origin cloud system to generate one or more tested performance metrics. In some examples, the one or more system test tasks may be transferred to the origin cloud system via a destination cloud system. In some examples, the one or more system test tasks may be transferred to an origin cloud system via a third party cloud system or general purpose computing system. In general, the test tasks may be transferred using any suitable communications technique or techniques. In some examples, the test task may be transferred via a virtual private network (VPN). In some examples, the test task may be transferred such that it appears to come from the customer from the perspective of the origin cloud system. In some examples, the test task may be transferred via the Internet.

In general, the test tasks may include any suitable task, group or series of tasks, or subtasks, or the like, that may be uploaded and run on the origin cloud system. In some examples, the test tasks may include one or more applications. In some examples, the test tasks may include one or more processes. In some examples, the test tasks may include one or more standard and/or library tasks. In some examples, the test tasks may include one or more client written tasks. In some examples, the test tasks may include tasks that may test configuration management systems that may adjust performance. For example, configuration management systems may assemble servers, network connections, or storage systems, or the like, to meet customer needs and/or templates. Providing test tasks to a cloud system may return performance metrics that may set required performance templates for a destination cloud system, for example. In some examples, the performance metrics may include level of latency or level of throughput, or the like. In some examples, the returned performance metrics may include different outputs based on different computation types at the cloud system. In some examples, the returned performance metrics may provide a characterization of the cloud system. In some examples, the returned performance metrics may substantially simulate or emulate the cloud system. In some examples, the test tasks may be used to test system architecture (e.g., whether a master-slave file system is in use), which may be implemented in the destination cloud system.

In some examples, the test tasks may be configured to test network and/or storage performance within the origin cloud system. In some examples, test tasks may be deployed to multiple machines and test performance metrics such as intra-messaging performance may be determined. In some examples, network delays may be judged using system time stamps. In some examples, system time stamp performance and network delays may both be tested by establishing a synchronizing link between multiple machines using the Precision Time Protocol or IEEE 1588 so that the error of intra-cloud clocks may be assessed. In some examples, multiple machine test tasks may be performed repeatedly and in large numbers to gauge typical network separation and/or delays, or the like. Related performance metrics may indicate whether a customer's deployment may be within a same server rack, or server row, or server center, or the like. In implementing a destination cloud system, such deployment characteristics may be substantially duplicated or deliberately modified or improved upon. In some examples, as discussed herein, the test performance metrics may be duplicated upon initial implementation at the destination cloud system and subsequently altered after stable performance has been attained.

In some examples, the test tasks may be configured to identify equipment at the origin cloud system. In some examples, test tasks may sense processor identifications and/or equipment types, or the like. In some examples, the received test performance metrics (in this instance equipment identifications or specifications) may be referenced at the destination cloud system such that analogous equipment may be provided and/or utilized.

In general, the one or more system test tasks may be configured to test a service deployment on the origin virtual machine to generate one and/or more tested performance metrics. The test tasks may be configured to run over any suitable duration such as for example, hours, days, weeks, or months. Running test tasks over longer durations may provide for statistical and variation information. In some examples, testing network parameters may be performed over longer durations such that a congestion event may not be caused by requesting a substantial number of tests over a short duration. Running test tasks over shorter durations may provide for faster turnaround time. In some examples, a system test task may be configured to generate a tested performance metric through passive observation of non-simulated operation of the origin virtual machine. In some examples, a system test task may be configured to generate a tested performance metric through active observation of simulated operation of the origin virtual machine. As is discussed below, in general, the tested performance metrics may include any suitable tested performance metrics. In some examples, the tested performance metrics may include a consistency-type metric, a transaction-type metric, a latency-type metric, a throughput-type metric, a data loss-type metric, a failover-type metric, or the like. The process of method 100 may continue at block 120.

At block 120, "Receive Tested Performance Metrics", one or more tested performance metrics may be received. In some examples, the one or more tested performance metrics may be received via a destination cloud system. In some examples, one or more tested performance metrics may be received via a third party cloud system or general purpose computing system. In general, the tested performance metrics may be received using any suitable communications technique or techniques. In general, the tested performance metrics may include any suitable information or data or the like. As discussed, in some examples, the tested performance metrics may include a consistency-type metric, a transaction-type metric, a latency-type metric, a throughput-type metric, a data loss-type metric, a failover-type metric, or the like. The process of method 100 may continue at block 130.

At block 130, "Configure a Virtual Machine", a virtual machine may be configured based at least in part on the received tested performance metrics. In general, the virtual machine may be configured in any suitable manner. In some examples, the virtual machine may be configured via the destination cloud system. In some examples, the virtual machine may be configured via a third party cloud system or general purpose computing system. In some examples, the virtual machine may be a destination virtual machine.

In some examples, the virtual machine may be configured to run a service deployment. In some examples, the virtual machine may be configured to run one or more service deployments transferred to a destination cloud system as at least a portion of a system test task as discussed at block 110. In some examples, configuring the virtual machine may include substantially mimicking the origin virtual machine on the configured virtual machine. In some examples, configuring the virtual machine may include configuring the virtual machine to alter or exceed one or more of the received tested performance metrics (as discussed at block 120). In some examples, configuring the virtual machine may include initially configuring the virtual machine to substantially mimic the origin virtual machine and, after configuring the destination virtual machine to substantially mimic the origin virtual machine, configuring the destination virtual machine to alter or exceed one or more of the tested performance metrics. In some examples, configuring the virtual machine may include configuring the virtual machine based at least in part on the received tested performance metrics and service level agreement data. In general, service level agreement data may include any data related to a cloud system service such as details pertaining to cloud service performance metrics, implementation specification, system details, or the like.

As discussed, in some examples, a destination virtual machine may be configured. In other examples, configuration data for a virtual machine may be generated and provided such that a virtual machine may be configured based on the generated configuration data. The process of method 100 may continue at block 140.

At block 140, "Determine a File System Architecture-Type", a file system architecture-type associated with the origin virtual machine may be determined. In general, the file system architecture-type may be determined in any suitable manner. In some examples, the file system architecture-type may be determined based at least in part on the received tested performance metrics. In some examples, the file system architecture-type may be determined by comparing the received tested performance metrics to known characteristics of known file system architectures. In some examples, the received tested performance metrics may include consistency, whether transactions may be supported, latency, throughput, data loss, whether failover may be supported, or the like.

In general, the file system architecture-type may include any suitable file system architecture-type. In various examples, the file system architecture-type may include a backup-type architecture, a master/slave-type architecture, a multiple master-type architecture, a two-phase commit-type architecture, and/or a Paxos-type architecture, or combinations thereof. In some examples, a backup-type architecture may be characterized by weak consistency, no transaction support, low latency, high throughput, substantial data loss, failover during down time, or the like. In some examples, a master/slave-type architecture may be characterized by eventual consistency, full transaction support, low latency, high throughput, some data loss, read only failover, or the like. In some examples, a multiple master-type architecture may be characterized by eventual consistency, local transaction support, low latency, high throughput, some data loss, read/write failover, or the like. In some examples, a two-phase commit-type architecture may be characterized by strong consistency, full transaction support, high latency, low throughput, no data loss, read/write failover, or the like. In some examples, a Paxos-type architecture may be characterized by strong consistency, full transaction support, high latency, medium throughput, no data loss, read/write failover, or the like.

As discussed, the present disclosure may describe methods and systems for a customer of an origin cloud system contemplating a transfer to a destination cloud system to obtain a detailed and wide ranging set of measurements from the origin data center before the customer moves applications and data to the destination or new data center. These measurements may allow the destination data center to prepare a destination environment to match, alter, or exceed the origin data center. It may also allow preparation of a detailed list showing the characteristics of the service level of the origin data center and a list of the characteristics of the service level of the new data center, for comparison or other purposes. In some examples, running test programs in the origin data center with a customer's service deployments may be used to characterize and measure the existing deployment performance, which may allow substantially direct measurement of the origin data center using the customer's current service deployments.

Figure 2:
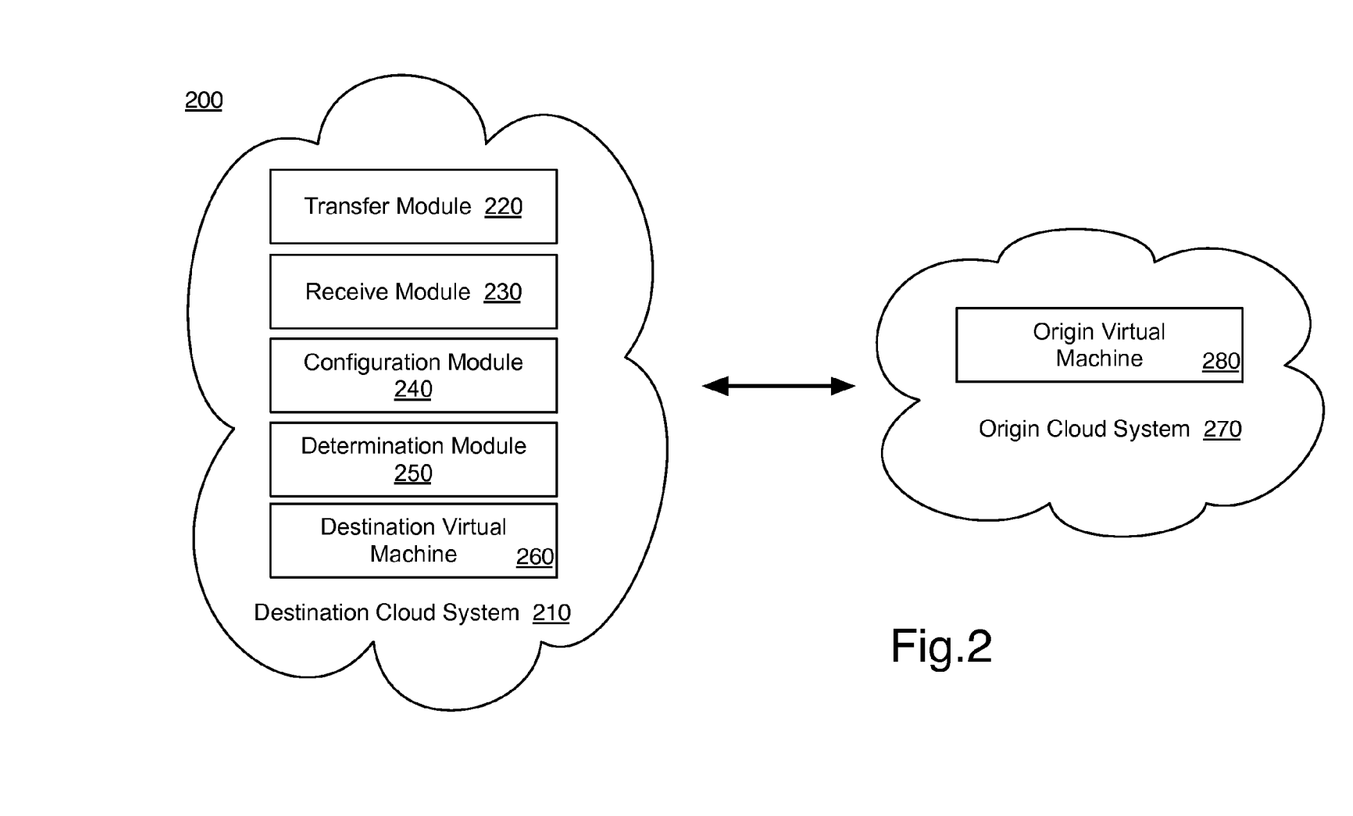
FIG. 2 is an illustration of an example system for testing a cloud system to determine destination cloud system requirements.

FIG. 2 is an illustration of an example system, arranged in accordance with at least some embodiments of the present disclosure. As shown, system 200 may include a destination cloud system 210 having transfer module 220, receive module 230, configuration module 240, determination module 250, and a destination virtual machine 260 and an origin cloud system 270 having an origin virtual machine 280. Although only one origin virtual machine is shown for the sake of clarity, origin cloud system may include several or many virtual machines. Further, a customer deployment at origin cloud system may be implemented over one, several, or many origin virtual machines.

In general, transfer module 220 may be configured to transfer one or more system test tasks from destination cloud system 210 to origin cloud system 270. As discussed, each system test task may be configured to test a service deployment on origin virtual machine 280 to generate one or more tested performance metrics. In general, the transferred system test task or tasks may include any system test tasks as discussed herein.

As shown, destination cloud system 210 may include receive module 230, which may be configured to receive the one or more tested performance metrics at destination cloud system 210. In general, the one or more tested performance metrics may include any of the test performance metrics as discussed herein. Destination cloud system 210 may also include configuration module 240, which may be configured to configure destination virtual machine 260 associated with the destination cloud system 210. In general, configuration module 240 may configure destination virtual machine 260 using any suitable technique or techniques including any of the techniques discussed herein. In some examples, destination virtual machine 260 may be configured to run the service deployment based at least upon the one or more tested performance metrics.

As shown, system 200 may include a determination module 250, which may be configured to determine a file system architecture-type associated with the origin virtual machine 280. In general, determination module 250 may be configured to determine the file system architecture-type using any suitable technique or techniques, such as the techniques discussed herein. In some examples, determination module 250 may be configured to determine the file system architecture-type based at least in part on the one or more tested performance metrics. As discussed, in some examples, the file system architecture may include any suitable file system architecture type or types including a backup-type architecture, a master/slave-type architecture, a multiple master-type architecture, a two-phase commit-type architecture, and/or a Paxos-type architecture, and/or other architecture type, and/or combinations thereof.

In some examples, configuration module 240 may configure destination virtual machine 260 such that configuring destination virtual machine 260 may substantially mimic origin virtual machine 280 on origin cloud system 270. In some examples, configuration module may configure destination virtual machine 260 such that configuring destination virtual machine 260 may include configuring destination virtual machine 260 to alter or exceed one or more of the received tested performance metrics. In some examples, configuration module 240 may configure destination virtual machine 260 such that configuring destination virtual machine 260 may include initially configuring destination virtual machine 260 to substantially mimic origin virtual machine 280 and, after configuring destination virtual machine 260 to substantially mimic origin virtual machine 280, configuring destination virtual machine 260 to alter one or more of the received tested performance metrics. In some examples, configuration module 240 may configure destination virtual machine 260 such that configuring destination virtual machine 260 may include configuring destination virtual machine 260 based at least in part on the received tested performance metrics and on service level agreement data, as discussed above with respect to FIG. 1.

In some examples, system test tasks results may be received at system 200 such as at receive module 230. In some example, system 200 may be configured to generate system test tasks. In general, the system test tasks may be generated in any suitable manner. In some example, system 200 may be configured to generate system test tasks such that the one or more system test tasks are configured to generate at least one of the one or more tested performance metrics through passive observation of non-simulated operation of the origin virtual machine. In some example, system 200 may be configured to generate system test tasks such that the one or more system test tasks are configured to generate at least one of the one or more tested performance metrics through active observation of simulated operation of the origin virtual machine.

Figure 4:
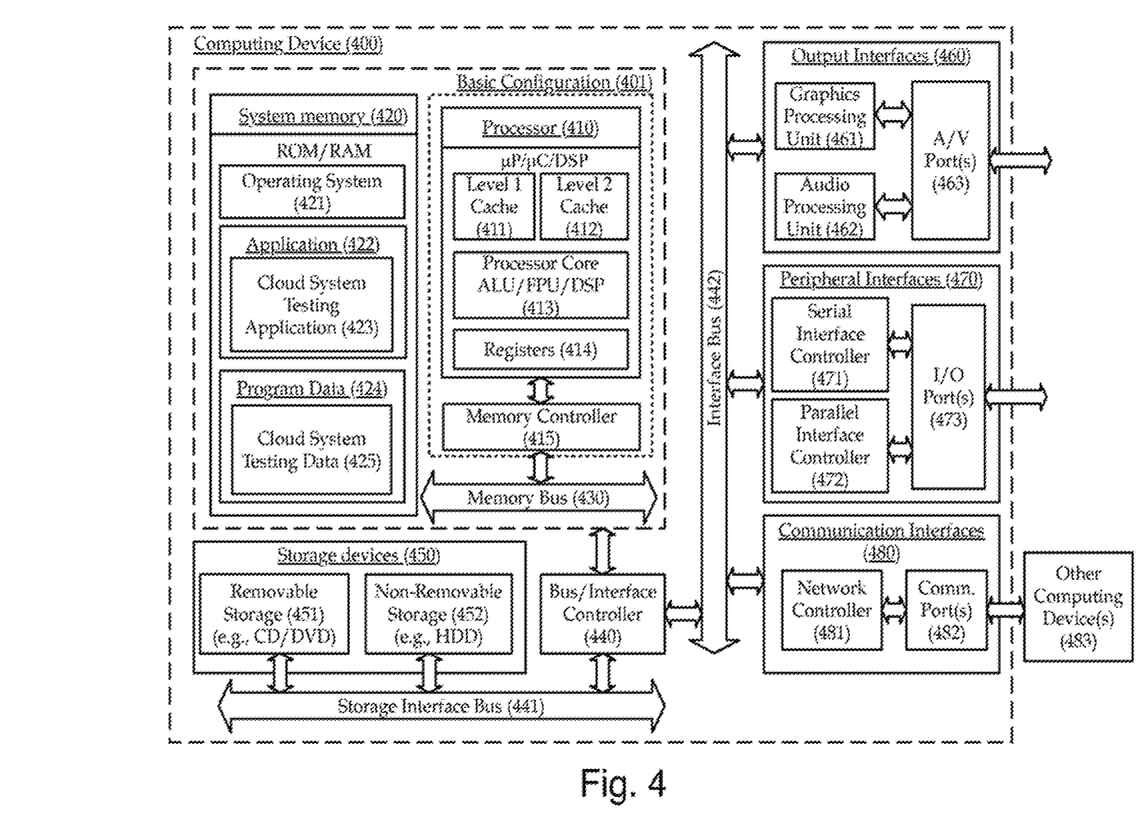
FIG. 4 is an illustration of a block diagram of an example computing device, all arranged in accordance with the present disclosure.

In general, destination cloud system 210 and transfer module 220, receive module 230, configuration module 240, determination module 250, and destination virtual machine 260 may be implemented in any suitable manner and may include any computing and/or communications resources such as processing resources, memory resources, and/or antenna resources, or the like, as discussed with respect to FIG. 4 and elsewhere herein. In some examples, transfer module 220, receive module 230, configuration module 240, and/or determination module 250 may share computing and/or communications resources.

Figure 3:
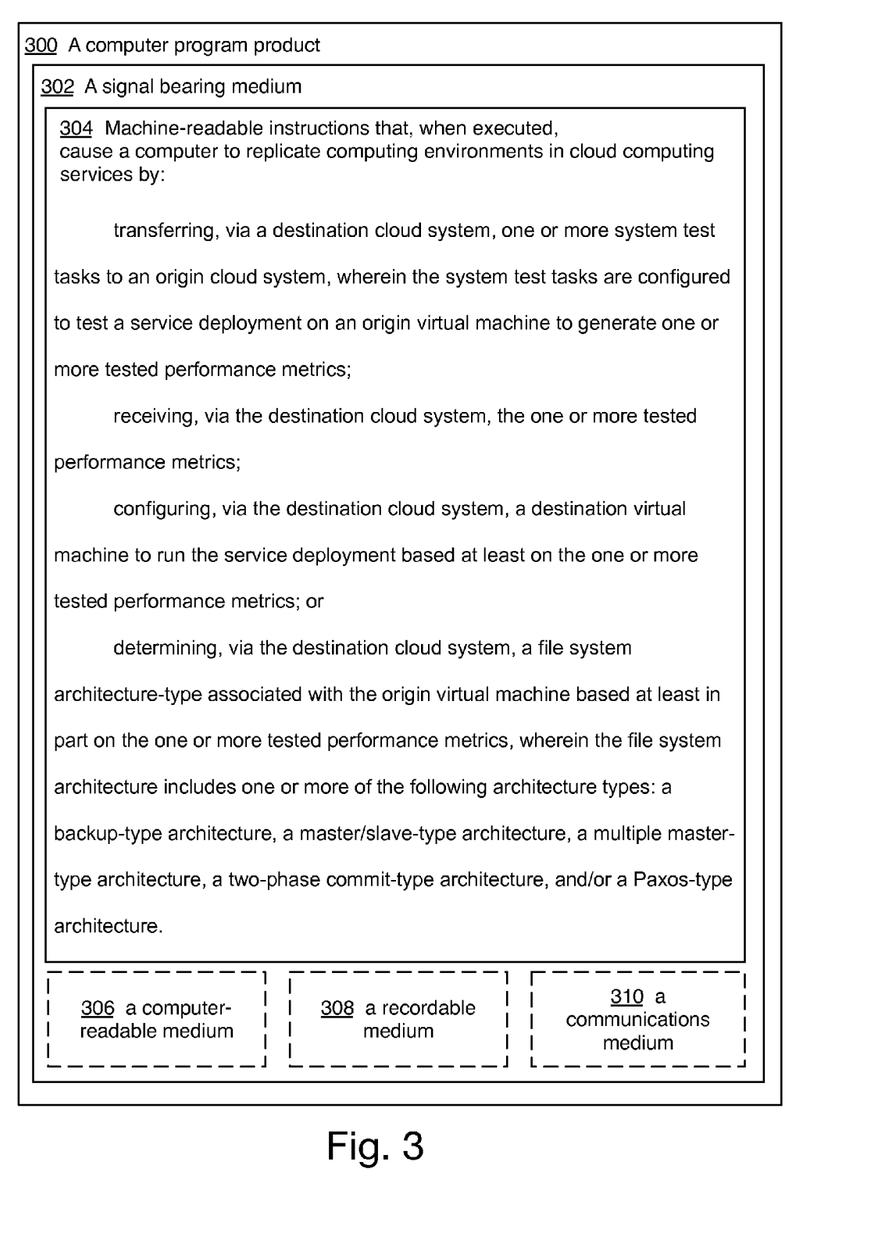
FIG. 3 is an illustration of an example computer program product.

FIG. 3 illustrates an example computer program product, arranged in accordance with at least some embodiments of the present disclosure. In general, computer program product 300 may include any suitable article or product. Computer program product 300 may include a signal bearing medium 302. Signal bearing medium 302 may include one or more machine-readable instructions 304, which, if executed by one or more processors, may operatively enable a computing device to provide the functionality described above with respect to FIG. 1. Thus, for example, referring to the system of FIG. 2, the modules may undertake one or more of the actions shown in FIG. 1 in response to instructions 304 conveyed by signal bearing medium 302.

In some examples, the machine readable instructions 304 may include instructions that, when executed, cause a computer to replicate computing environments in cloud computing services by transferring, via a destination cloud system, one or more system test tasks to an origin cloud system, wherein the system test tasks are configured to test a service deployment on an origin virtual machine to generate one or more tested performance metrics. In some examples, the machine readable instructions 304 may include instructions that, when executed, cause a computer to replicate computing environments in cloud computing services by receiving, via the destination cloud system, the one or more tested performance metrics. In some examples, the machine readable instructions 304 may include instructions that, when executed, cause a computer to replicate computing environments in cloud computing services by configuring, via the destination cloud system, a destination virtual machine to run the service deployment based at least on the one or more tested performance metrics. In some examples, the machine readable instructions 304 may include instructions that, when executed, cause a computer to replicate computing environments in cloud computing services by determining, via the destination cloud system, a file system architecture-type associated with the origin virtual machine based at least in part on the one or more tested performance metrics, wherein the file system architecture includes one or more of the following architecture types: a backup-type architecture, a master/slave-type architecture, a multiple master-type architecture, a two-phase commit-type architecture, and/or a Paxos-type architecture.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.).

FIG. 4 is a block diagram illustrating an example computing device 400, arranged in accordance with at least some embodiments of the present disclosure. In various examples, computing device 400 may be configured to replicate computing environments in cloud computing services as discussed herein. In various examples, computing device 400 may be configured to transfer system tasks, receive tested performance metrics, configure a destination virtual machine, and/or determine a file system architecture-type as discussed herein. In one example basic configuration 401, computing device 400 may include one or more processors 410 and system memory 420. A memory bus 430 can be used for communicating between the processor 410 and the system memory 420.

Depending on the desired configuration, processor 410 may be of any type including but not limited to a microprocessor (μP), a microcontroller (μC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 may also be used with the processor 410, or in some implementations the memory controller 415 may be an internal part of the processor 410.

Depending on the desired configuration, the system memory 420 may be of any type including but not limited to volatile memory (such as RAM), non-volatile memory (such as ROM, flash memory, etc.) or any combination thereof. System memory 420 may include an operating system 421, one or more applications 422, and program data 424. Application 422 may include a cloud system testing application 423 that is arranged to perform the functions as described herein including the functional blocks and/or actions described with respect to method 100 of FIG. 1. Program Data 424 may include cloud system testing data 425 for use by cloud system testing application 423, for example, data corresponding to system test tasks, tested performance metrics, virtual machine configuration data, or the like. In some example embodiments, application 422 may be arranged to operate with program data 424 on an operating system 421 such that implementations of virtual machine replication may be provided as described herein.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 may include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication interface 480 includes a network controller 481, which may be arranged to facilitate communications with one or more other computing devices 483 over a network communication via one or more communication ports 482. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 400 may also be implemented as a personal computer including both laptop computer and non-laptop computer configurations. In addition, computing device 400 may be implemented as part of a cloud computing environment, cloud computing service, or data center, or the like.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity;

control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosed subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method, comprising:
   transferring, via a destination cloud system, one or more system test tasks to an origin cloud system, wherein the system test tasks are configured to test a service deployment on an origin virtual machine to generate one or more tested performance metrics including one or more of the following metric types: a consistency-type metric, a transaction-type metric, a latency-type metric, a throughput-type metric, a data loss-type metric, and/or a failover-type metric by establishing a synchronizing link between the origin virtual machine and a destination virtual machine using a predefined protocol so that an error of intra-cloud clocks can be assessed;
   receiving, via the destination cloud system, the one or more tested performance metrics;

configuring, via the destination cloud system, the destination virtual machine to run the service deployment based at least on the one or more tested performance metrics; and determining, via the destination cloud system, a file system architecture-type associated with the origin virtual machine based at least in part on the one or more tested performance metrics, wherein the file system architecture includes one or more of the following architecture types: a backup-type architecture, a master/slave-type architecture, a multiple master-type architecture, a two-phase commit-type architecture, or a Paxos-type architecture;

wherein configuring the destination virtual machine comprises initially configuring the destination virtual machine to mimic the origin virtual machine; and subsequent to configuring the destination virtual machine to mimic the origin virtual machine, configuring the destination virtual machine to exceed one or more of the tested performance metrics, wherein configuring the destination virtual machine comprises configuring the destination virtual machine based at least in part on tested performance metrics and on service level agreement data which may include data relating to cloud service performance metrics, implement specification, or system details;

wherein the one or more system test tasks are configured to generate at least one of the one or more tested performance metrics through passive observation of non-simulated operation of the origin virtual machine; and wherein the one or more system test tasks are configured to generate at least one of the one or more tested performance metrics through active observation of simulated operation of the origin virtual machine.

2. The method of claim 1, wherein configuring the destination virtual machine comprises mimicking the origin virtual machine on the destination virtual machine.

3. The method of claim 1, wherein configuring the destination virtual machine comprises configuring the destination virtual machine to exceed one or more of the tested performance metrics.

4. The method of claim 1, wherein configuring the destination virtual machine comprises initially configuring the destination virtual machine to mimic the origin virtual machine; and after configuring the destination virtual machine to mimic the origin virtual machine, configuring the destination virtual machine to exceed one or more of the tested performance metrics.

5. The method of claim 1, wherein configuring the destination virtual machine comprises configuring the destination virtual machine based at least in part on tested performance metrics and on service level agreement data.

6. The method of claim 1, wherein the one or more system test tasks are configured to generate at least one of the one or more tested performance metrics through passive observation of non-simulated operation of the origin virtual machine.

7. The method of claim 1, wherein the one or more system test tasks are configured to generate at least one of the one or more tested performance metrics through active observation of simulated operation of the origin virtual machine.

8. The method of claim 1, further comprising determining, via the destination cloud system, a file system architecture-type associated with the origin virtual machine based at least in part on the one or more tested performance metrics, wherein the file system architecture includes one or more of the following architecture types: a backup-type architecture, a master/slave-type architecture, a multiple master-type architecture, a two-phase commit-type architecture, and/or a Paxos-type architecture.

9. A computing device, comprising:
a processor;
a memory comprising logic instructions which, when executed by the processor, configure the processor to define:
a first module configured to transfer one or more system test tasks from a destination cloud system to an origin cloud system, wherein the system test tasks are configured to test a service deployment on an origin virtual machine to generate one or more tested performance metrics including one or more of the following metric types: a consistency-type metric, a transaction-type metric, a latency-type metric, a throughput-type metric, a data loss-type metric, and/or a failover-type metric by establishing a synchronizing link between the origin virtual machine and a destination virtual machine using a predefined protocol so that an error of intra-cloud clocks can be assessed;
a second module configured to receive the one or more tested performance metrics at the destination cloud system;
a third module configured to configure the destination virtual machine associated with the destination cloud system to run the service deployment based at least on the one or more tested performance metrics; and
a fourth module to determine, via the destination cloud system, a file system architecture-type associated with the origin virtual machine based at least in part on the one or more tested performance metrics, wherein the file system architecture includes one or more of the following architecture types: a backup-type architecture, a master/slave-type architecture, a multiple master-type architecture, a two-phase commit-type architecture, or a Paxos-type architecture;

wherein configuration of the destination virtual machine comprises initially configuring the destination virtual machine to mimic the origin virtual machine; and subsequent to the configuration of the destination virtual machine to mimic the origin virtual machine, configure the destination virtual machine to exceed one or more of the tested performance metrics, wherein configuring the destination virtual machine comprises configuring the destination virtual machine based at least in part on tested performance metrics and on service level agreement data which may include data relating to cloud service performance metrics, implement specification, or system details;

wherein the one or more system test tasks are configured to generate at least one of the one or more tested performance metrics through passive observation of non-simulated operation of the origin virtual machine; and wherein the one or more system test tasks are configured to generate at least one of the one or more tested performance metrics through active observation of simulated operation of the origin virtual machine.

10. The computing device of claim 9, wherein configuring the destination virtual machine comprises mimicking the origin virtual machine on the destination virtual machine.

11. The computing device of claim 9, wherein configuring the destination virtual machine comprises configuring the destination virtual machine to exceed one or more of the tested performance metrics.

12. The computing device of claim 9, wherein configuring the destination virtual machine comprises initially configuring the destination virtual machine to mimic the origin virtual machine; and after configuring the destination virtual machine to mimic the origin virtual machine, configuring the destination virtual machine to exceed one or more of the tested performance metrics.

13. The computing device of claim 9, wherein configuring the destination virtual machine comprises configuring the destination virtual machine based at least in part on tested performance metrics and on service level agreement data.

14. The computing device of claim 9, wherein the one or more system test tasks are configured to generate at least one of the one or more tested performance metrics through passive observation of non-simulated operation of the origin virtual machine.

15. The computing device of claim 9, wherein the one or more system test tasks are configured to generate at least one of the one or more tested performance metrics through active observation of simulated operation of the origin virtual machine.

16. A non-transitory computer readable medium storing logic instructions which, when executed by a processor, configure the processor to:

transfer one or more system test tasks from a destination cloud system to an origin cloud system, wherein the system test tasks are configured to test a service deployment on an origin virtual machine to generate one or more tested performance metrics including one or more of the following metric types: a consistency-type metric, a transaction-type metric, a latency-type metric, a throughput-type metric, a data loss-type metric, and/or a failover-type metric by establishing a synchronizing link between the origin virtual machine and a destination virtual machine using a predefined protocol so that an error of intra-cloud clocks can be assessed;

receive the one or more tested performance metrics at the destination cloud system;

configure the destination virtual machine associated with the destination cloud system to run the service deployment based at least on the one or more tested performance metrics; and determine, via the destination cloud system, a file system architecture-type associated with the origin virtual machine based at least in part on the one or more tested performance metrics, wherein the file system architecture includes one or more of the following architecture types: a backup-type architecture, a master/slave-type architecture, a multiple master-type architecture, a two-phase commit-type architecture, or a Paxos-type architecture;

wherein configuration of the destination virtual machine comprises initially configuring the destination virtual machine to mimic the origin virtual machine; and subsequent to the configuration of the destination virtual machine to substantially mimic the origin virtual machine, configure the destination virtual machine to exceed one or more of the tested performance metrics, wherein configuring the destination virtual machine comprises configuring the destination virtual machine based at least in part on tested performance metrics and on service level agreement data which may include data relating to cloud service performance metrics, implement specification, or system details;

wherein the one or more system test tasks are configured to generate at least one of the one or more tested performance metrics through passive observation of non-simulated operation of the origin virtual machine; and wherein the one or more system test tasks are configured to generate at least one of the one or more tested performance metrics through active observation of simulated operation of the origin virtual machine.

\* \* \* \* \*